United States Patent
I (10) Patent No.: US 8,424,698 B2
(45) Date of Patent: Apr. 23, 2013

(54) CASE AND METHOD FOR UNLOCKING THE CASE

(75) Inventor: Sunsoku I, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 63 days.

(21) Appl. No.: 13/224,431

(22) Filed: Sep. 2, 2011

(65) Prior Publication Data

US 2012/0055927 A1    Mar. 8, 2012

(30) Foreign Application Priority Data

Sep. 6, 2010 (JP) .................................. 2010-198966

(51) Int. Cl.
*H02G 3/08* (2006.01)

(52) U.S. Cl.
USPC .......................................................... 220/3.8

(58) Field of Classification Search .................... 220/3.2, 220/3.8, 4.02, 4.21, 324; 174/50
See application file for complete search history.

(56) References Cited

U.S. PATENT DOCUMENTS

| | | | | |
|---|---|---|---|---|
| 751,003 | A * | 2/1904 | Perry ............................ | 200/294 |
| 6,545,217 | B2 * | 4/2003 | Sato ................................ | 174/50 |
| 6,629,619 | B2 * | 10/2003 | Sato et al. ..................... | 220/4.02 |
| 7,077,281 | B2 * | 7/2006 | Sato et al. ..................... | 220/3.8 |
| 2003/0000726 | A1 * | 1/2003 | Miyakoshi .................. | 174/65 R |

FOREIGN PATENT DOCUMENTS

JP        6-61743 U        8/1994

* cited by examiner

*Primary Examiner* — Harry Grosso (74) *Attorney, Agent, or Firm* — Edwards Wildman Palmer LLP (57) ABSTRACT

The case includes a case main body, a cove mounted at the case main body, and lock members fixing the case main body and the cover by supporting one end of the lock member rotatably at the cover and hooking the other end of the lock member at a lock portion provided at the case main body. The lock members are arranged between one ends of the case main body and the cover and between the other ends of the case main body and the cover. A fat surface portion, on which an edge of the cover is overlapped, and a recess formed by cutting a part from the flat surface portion so as to make a gap between the edge and the case main body when the case main body and the cover are fixed by the lock members are provided at the case main body.

2 Claims, 7 Drawing Sheets

CASE AND METHOD FOR UNLOCKING THE CASE

The priority application Number Japan Patent Application 2010-198966 upon which this patent application is based is hereby incorporated by reference.

TECHNICAL FIELD

This invention relates to a case to be used for an electric connection box.

BACKGROUND ART

Many various electronic apparatuses are provided in a car. For supplying electric power and transmitting signals to the many various electronic apparatuses, an electric connection box is mounted in the car. The electric connection box, which is configured to have one of various structures, is applied for that. For example, an electric connection box 201 having a case 210 shown in FIGS. 6 and 7 is known (see Patent Document 1).

Figure 6:
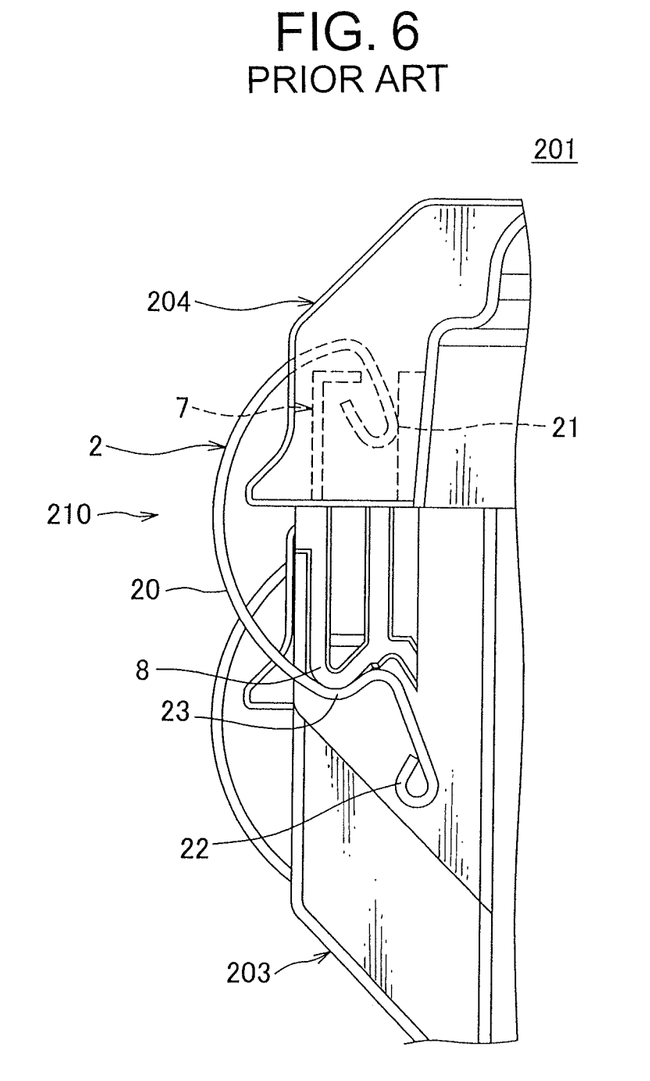
FIG. 6 is a plan view of a usual case by prior art.
Figure 7:
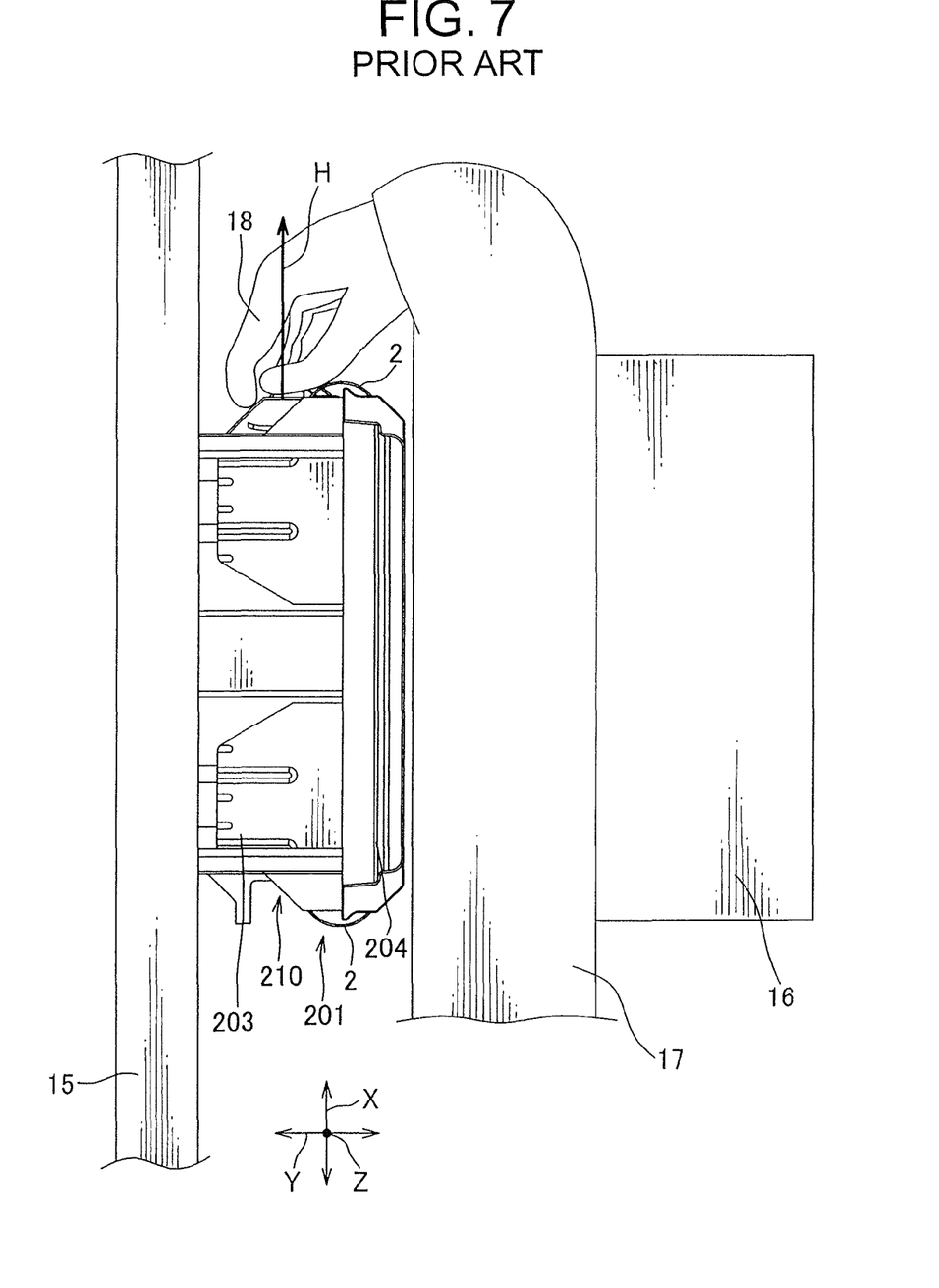
FIG. 7 is an illustration showing a method for unlocking the case shown in FIG. 6, which is mounted at a car body.

The case 210 shown in FIG. 6 includes a case main body 203, a cover 204 attached to the case main body 203 and a plurality of lock members 2 locking the case main body 203 and the cover 204.

The lock member 2 is a flat spring formed by pressing a metal sheet. The lock member 2 is structured by a curved portion 20 formed into an arc shape, a fixing end portion 21 arranged at one end of the curved portion 20 and formed into a U-shape, a lock end 23 arranged at the other end of the curved portion 20 and formed into a V-shape, and an operating portion 22 arranged at an end of the lock end 23 apart from the curved portion 20.

The cover 204 is provided respectively at one end thereof and at the other end thereof with a support portion 7 supporting the fixing end 21 of the lock member 2. The case main body 203 is provided respectively at one end thereof and at the other end thereof with a lock portion 8 which is locked with the lock end 23 of the lock member 2. The support portion 7 is formed into a box shape having an insert opening at a side thereof apart from the case main body 203. The fixing end portion 21 is inserted through the insert opening into the support portion 7 so as to be supported rotatably at the support portion 7. The lock portion 8 is formed projectingly at a side thereof apart from the cover 204. The lock end 23 is hooked at the lock portion 8 and locked with the lock portion 8.

According to the case 210, the cover 204 is mounted at the case main body 203 so as to support the fixing end 21 at the support portion 7. The operating portion 22 is pushed toward a side wall of the case main body 203 so that the lock end 23 is locked with the lock portion 8 and the case main body 203 and the cover 204 are fixed together by the lock member 2. When the lock end 23 is locked at the lock portion 8, by pulling the operating portion 22 so as to be separated from the side wall of the case main body 203, locking of the lock end 23, that is the lock member 2, and the lock portion 8 is unlocked.

The electric connection box 201 having the above-mentioned case 210 is mounted usually at a car body 15 shown in FIG. 7. In FIG. 7, a battery is shown with marking 16. An arm of an operator is shown with marking 18. The electric connection box 201 may be mounted at the car body 15 for lack of an alternative so as to make a room between the case 210 and the battery 16, in which only one arm 17 can be inserted.

CITATION LIST

Patent Document

Patent Document 1: J.U.M. Application Published No. H06-61743

SUMMARY OF INVENTION

Objects to be Solved

The electric connection box 201 having the above-mentioned case 210 has a following problem. When the electric connection box 201 is mounted in the car body 15 for lack of an alternative so as to make a room between the case 210 and the battery 16, in which only one arm 17 can be inserted, there is a problem that it is very difficult for the operator to unlock the lock member 2 provided at a deep side of the case 210 from an operating position of the operator.

In other words, as shown in FIG. 7, when unlocking the lock member 2 located at the deep side of the case 210, the operator has to stretch an own arm and pull the operating portion 22 in a direction shown by an arrow H. In such condition of stretching the own arm, the operation of pulling is very difficult, so that it is a problem that unlocking the lockmember 2 is very difficult.

The above problem may appear when the case is applied for a object other than the electric connection box.

According to the above problems, an object of the present invention is to provide a case, in which a lock member can be easily unlocked even if the case is provided at a narrow area for operating so as to be close to other components around the case, and a method for unlocking the case.

How to Attain the Object of the Present Invention

In order to overcome the above problems and attain the object, the present invention is to provide a case including a case main body; a cover mounted at the case main body; a plurality of lock members, wherein one end of the lock member is supported rotatably at one of the case main body and the cover, and the other end of the lock member is hooked to a lock portion, which is arranged at the other one of the case main body and the cover, so as to fix the case main body and the cover together; and the plurality of lock members is arranged between one ends of the case main body and the cover and between the other ends of the case main body and the cover, and the case main body is provided with a flat surface portion, on which an edge of the cover at a side near to the case main body is placed, and a recess portion, which is formed by cutting off a part of the flat surface portion at the other end of the case main body so as to make a space between the edge of the cover and itself when the case main body and the cover are fixed by the plurality of lock members.

The present invention according to the application is a method for unlocking the case mentioned above having steps of unlocking the lock members, which are arranged between the one ends of the case main body and the cover, locked with the lock portions in condition that the case main body and the cover are locked by the plurality of lock members; successively moving the one end of the cover to be separated from the case main body and the other end of the cover to be close toward the recess portion so as to rotate the cover around a corner formed between the flat surface portion and the recess portion as a fulcrum; and unlocking the lock members and the lock portions provided between the other ends of the case main body and the cover.

Effects of the Invention

According to the present invention, the plurality of lock members is arranged between one ends of the case main body and the cover and between the other ends of the case main body and the cover, and the case main body is provided with the flat surface portion on which the edge of the cover at the side near to the side of the case main body, and the recess portion, which is formed by cutting off a part of the flat surface portion at the other end of the case main body so as to make a space between the edge of the cover and itself when the case main body and the cover are fixed by the plurality of lock members, so that by unhooking the lock members, which are arranged between the one ends of the case main body and the cover, locked with the lock portions in condition that the case main body and the cover are locked by the plurality of lock members; successively by moving up the one end of the cover to rotate the cover around a corner formed between the flat surface portion and the recess portion as a fulcrum so as to separate the one end of the cover from the case main body and approach the other end of the cover toward the recess portion; locking of the lock members and the lock portions provided between the other ends of the case main body and the cover can be unlocked without touching the lock members. Therefore, the case, which lock member can be easily unlocked even if the case is arranged in a narrow working space, in which the other components near around the case, can be provided.

According to the present invention, by unlocking the case mentioned above having steps of unlocking the lock members, which are arranged between the one ends of the case main body and the cover, locked with the lock portions in condition that the case main body and the cover are locked by the plurality of lock members; and by successively moving the one end of the cover to separate the one end of the cover from the case main body and the other end of the cover to be close toward the recess portion so as to rotate the cover around a corner formed between the flat surface portion and the recess portion as a fulcrum; locking of the lock members and the lock portions provided between the other ends of the case main body and the cover can be unlocked without touching the lock members. Therefore, the lock member can be easily unlocked even if the case is arranged in a narrow working space, in which the other components near around the case.

DESCRIPTION OF EMBODIMENTS

An electric connection box 1 having a case 10 as a first embodiment according to the present invention and a method for unlocking the case 10 are described with reference to drawings FIGS. 1-5.

The electric connection box 1 is mounted at a car for supplying electric power and transmitting signals to an electronic apparatus mounted at the car. In the present invention, a junction block (or junction box), a fuse block (or fuse box) and a relay block (or relay box) are called electric connection box as a generic name, hereafter.

Figure 1:
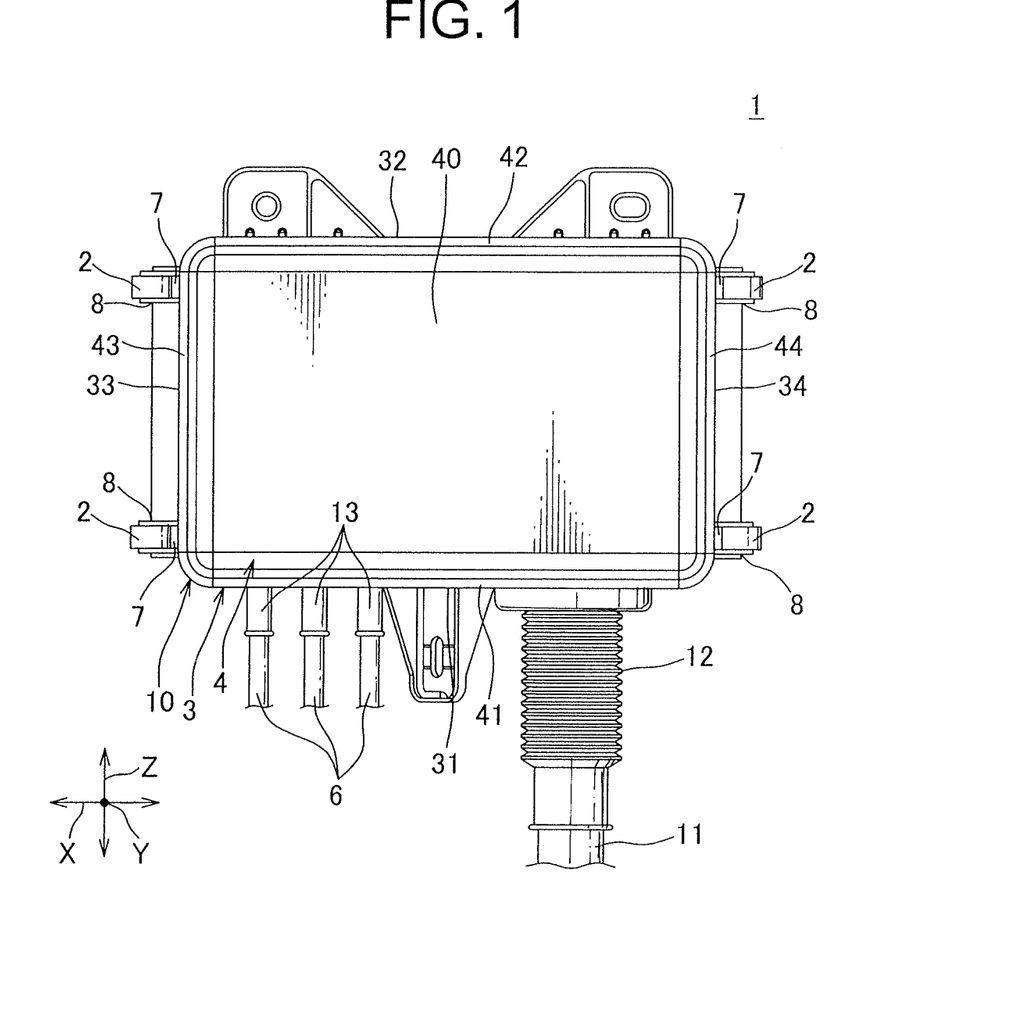
FIG. 1 is a plan view of a case of an embodiment according to the present invention.
Figure 2:
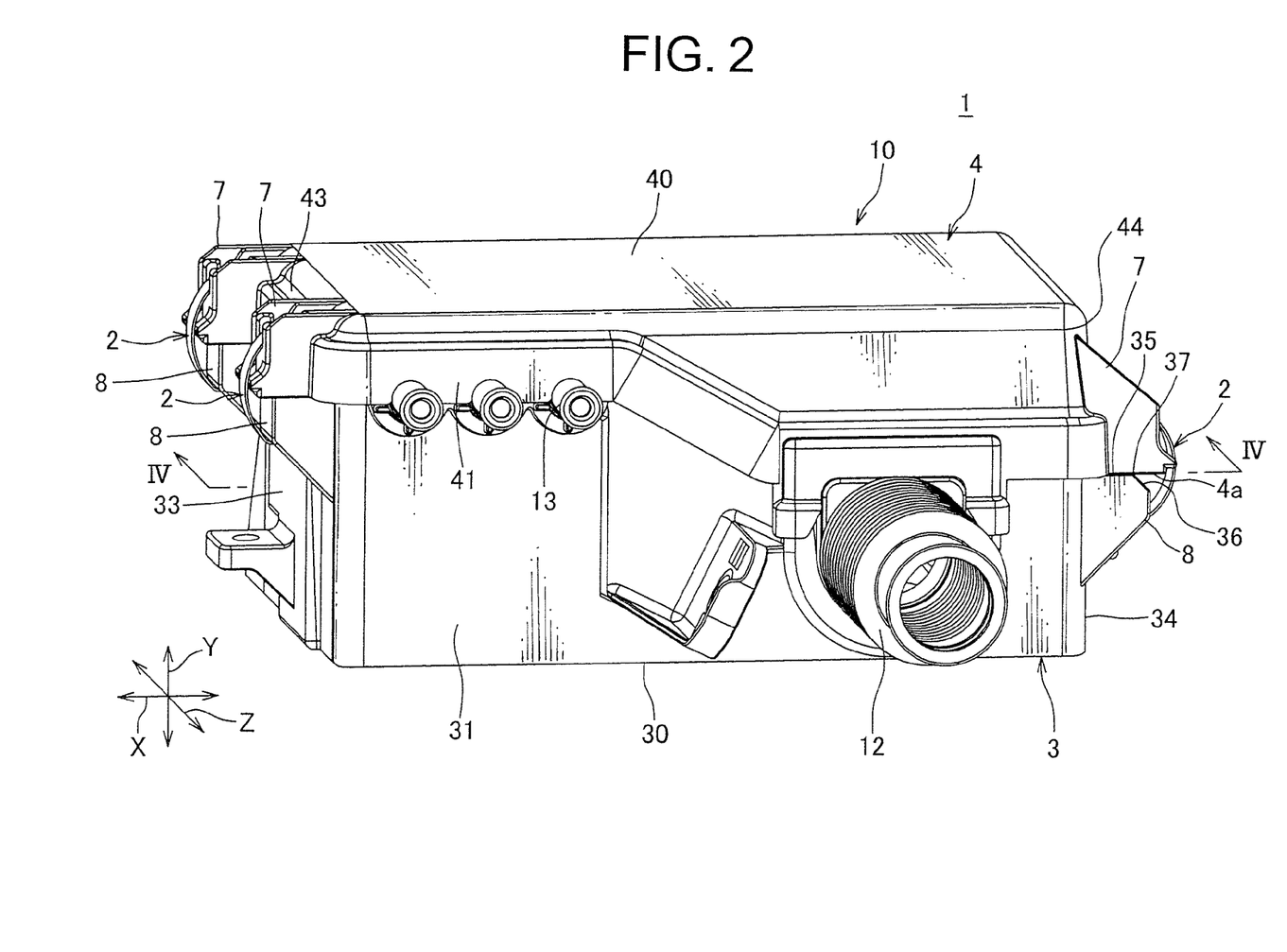
FIG. 2 is a perspective view of the case shown in FIG. 1.

The electric connection box 1 as shown in FIGS. 1 and 2 includes a plurality of electric components such as a relay, a fuse and a bus bar; the case 10, in which the electric components are received; a grommet 12 passing electric wires of a wiring harness led into the case 10 through an inside of the grommet 12 for waterproofing the case 10; and a grommet 13 arranged at a power supply cable 6 led into the case 10 for waterproofing the case 10. The electric wires 11 of the wiring harness and the electric power cable 6 are omitted in FIGS. 2 and 3.

The case 10 includes a case main body 3, a cove 4 mounted at the case main body 3 so as to cover an opening of the case main body 3, and a plurality of lock members 2 fixing the case main body 3 and the cover 4.

The case main body 3 is formed with synthetic resin into a box shape so as to include a rectangular-plate-formed bottom wall 30 and a plurality of side walls 31, 32, 33, 34 extending vertically from outer edges of the bottom wall 30 in a direction shown by an arrow Y. The opening is formed as an area surrounded by edges of the plurality of side walls 31, 32, 33, 34 at a side apart from the bottom wall 30.

An arrow X shown in FIGS. 1-5 indicates a lengthwise direction of the bottom wall 30, that is of the case main body 3. An arrow Z shown in FIGS. 1-5 indicates a widthwise direction of the bottomwall 30, that is of the case main body 3. The direction by the arrow X and the direction by the arrow Z intersect perpendicularly to each other. The direction by the arrow Y shown in FIGS. 1-5 intersects rectangularly both the directions by the arrow X and the arrow Z, and indicates a depth direction of the case main body 3.

The cover 4 is formed with synthetic resin into a box shape so as to include a rectangular-plate-formed top wall 40 and a plurality of side walls 41, 42, 43, 44 extending vertically from outer edges of the top wall 40. The cover 4 is mounted to the case main body 3 so as to arrange the top wall 40 of the cover 4 corresponding to the bottom wall 30 of the case main body 3 and overlap the side walls 41, 42, 43, 44 respectively to side walls 31, 32, 33, 34 of the case main body 3.

Figure 3:
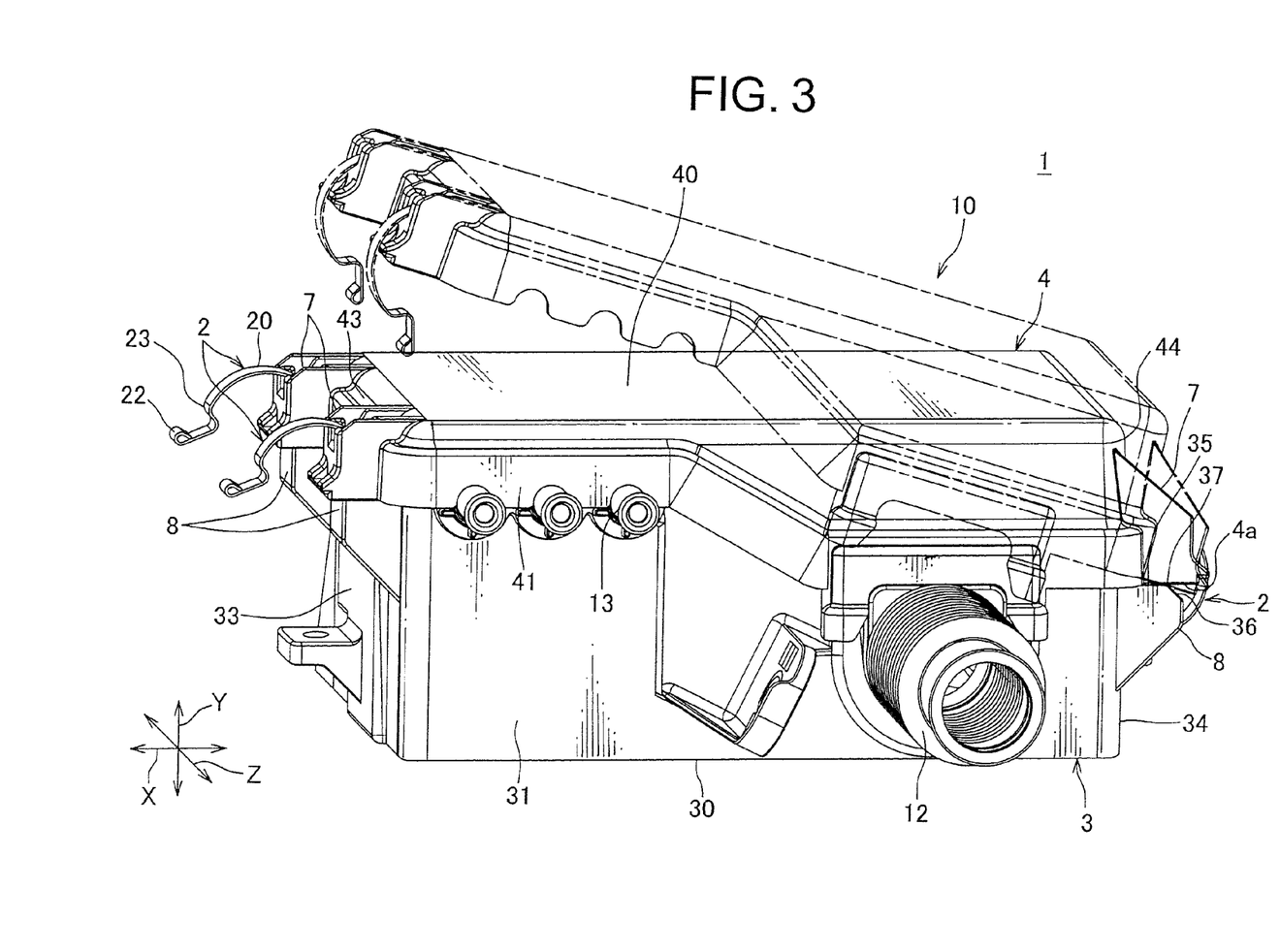
FIG. 3 is an illustration showing a method for unlocking the case shown in FIG. 2.
Figure 4:
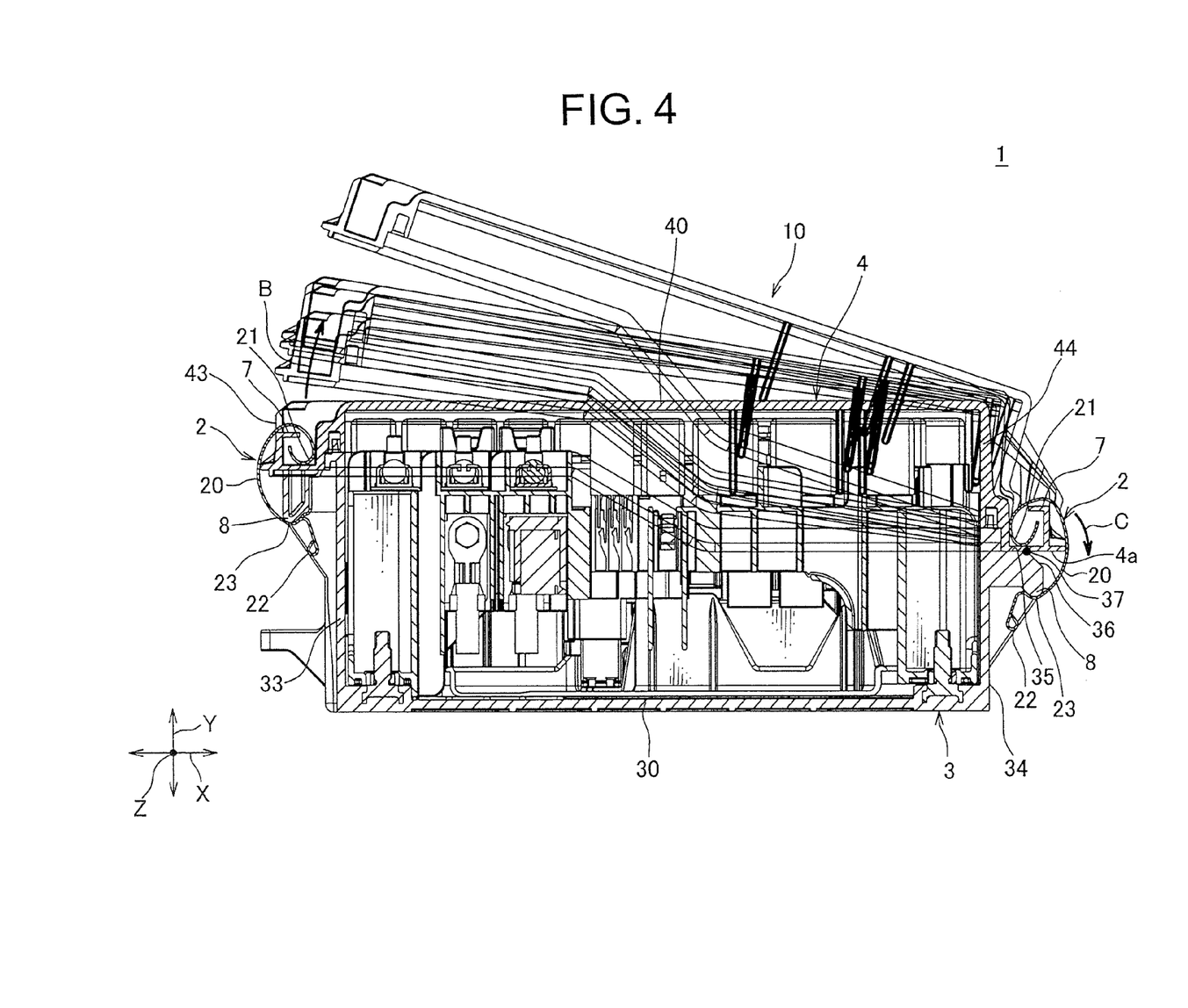
FIG. 4 is a cross-sectional view taken along line IV-IV shown in FIG. 2 and showing loci of the moving cover.

The lockmember 2 is a flat plate spring formed by pressing metallic sheet. The lockmember 2 is structured by a curved portion 20 formed into an arc shape, a fixing end portion 21 arranged at one end of the curved portion 20 and formed into a U-shape, a lock end 23 arranged at the other end of the curved portion 20 and formed into a V-shape, and an operating portion 22 arranged at an end of the lock end 23 apart from the curved portion 20, as shown in FIGS. 3 and 4. In the embodiment, two lock members 2 and 4 are provided at the case 10.

At each of the side walls 43 and 44 of the cover 4, two support portions 7 supporting the fixing end portion 21 of the lock member 2 are provided. At each of the side walls 33 and 34 of the case main body 3, two lock portions 8 locked with the lock end 23 of the lock member 2 are provided. Thus, the lock members 2 are arranged between one ends of the case main body 3 and the cover 4 in the direction shown by the arrow X (ends of the side walls 33 and 43) and between the other ends of the case main body 3 and the cover 4 in the direction shown by the arrow X (ends of the side walls 34 and 44). In other words, the lock members 2 are arranged at four corners of the case 10. The support portion 7 is formed into a box shape in which a through hole is provided at a side part from the case main body 3. The fixing end portion 21 is inserted through the through hole into the support portion 7 so as to be supported rotatably by the support portion 7. The lock portion 8 is formed projectingly so as to be apart from the cover 4. The lock end 23 is hooked to the lock portion 8 so as to be locked with the lock portion 8.

Figure 5:
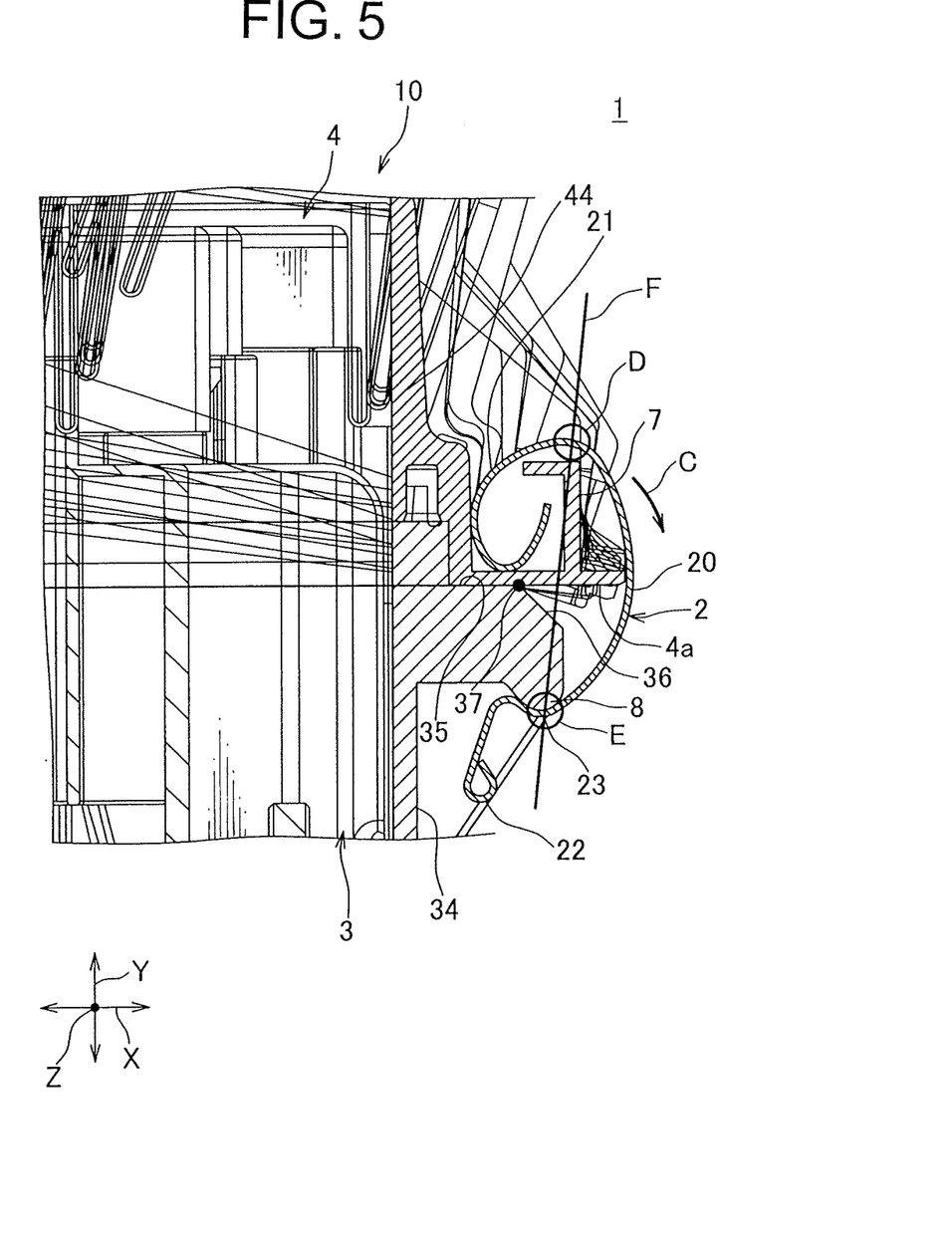
FIG. 5 is a partially expanded cross-sectional view of a main area of the case.

In the case 10 according to the present invention, as shown in FIG. 5, a flat surface portion 35, on which an edge 4a of the cover 4 at a side near to the case main body 3 is overlapped, is provided at the case main body 3. The flat surface portion 35 is parallel to the directions shown by the arrows X and Z. The case 10 is provided at the other end of the case main body 3, that is at end of the case main body 3 at a side of the side wall 34, with a recess portion 36 which is formed by cutting off a part of the flat surface portion 35 at the other end of the case main body 3 so as to make a space between the edge 4a of the cover 4 and itself when the case main body 3 and the cover 4 are fixed by the plurality of lock members 2 (shown in FIG. 2). In other words, the recess portion 36 is formed by cutting a part intersecting a fictitious line F into a triangle shape. The recess portion 36 inclines to the flat surface portion 35.

In the case 10 having the above-mentioned four lock members 2, the fixing end portion 21 of each lock member 2 is supported by the support portion 7, and in such condition, the cover 4 is attached to the case main body 3. Furthermore, the operating portion 22 of each lock member 2 is respectively pushed toward the side walls 33 and 34 of the case main body 3, and thereby, the lock end 23 is locked with the lock portion 8, so that the cover 4 is fixed with the case main body 3 by the four lock members 2. By pulling the operating portion 22 so as to be separated from the side walls 33 and 34 of the case main body 3 when the lock end 23 is locked with the lock portion 8, locking of the lock end 23, that is the lock member 2, and the lock portion 8 is unlocked.

Two lock members 2 of the four lock members 2, which are arrange nearer to the side walls 34 and 44 than the other two lock members 2, that is between the other ends of the case main body 3 and the cover 4, can be unlocked by nipping and pulling the operating portion 22 with fingers so as to separate the operating portion 22 from the side wall 34. Alternatively, the two lock members 2 locked with the lock portion 8 also can be unlocked by the following method for unlocking.

The method for unlocking, which is the method for unlocking the locking of the two lock members 2 and the lock portion 8 arranged nearer to the side walls 33 and 43 according to the present invention, will be described. In condition that the case main body 3 and the cover 4 are fixed by the four lock members 2, locking of the two lock members 2, which are arranged at the side near to side walls 33 and 43, and the lock portion 8 is unlocked (see a part shown with a solid line in FIG. 3).

The two lock members 2 locked with the lock portion 8 are unlocked by nipping and pulling the operating portion 22 with fingers so as to separate the operating portion 22 from the side wall 33. Successively, as shown in FIGS. 3-5, the one end of the cover 4, which is near to the side wall 43, is moved up so as to be separated from the case main body (in a direction shown by an arrow B in FIG. 4) and the other end of the cover 4, which is near to the side wall 44, is moved toward the recess portion (in a direction shown by an arrow C in FIG. 4), so that the cover 4 is rotated around a corner 37 formed between the flat surface portion 35 and the recess portion 36 as a fulcrum. Thereby, the lock end 23 of the two lock members 2 arranged at the side near to side walls 34 and 44 is moved off from the lock portion 8, and locking of the two lock members 2 and the lock portions 8 is unlocked.

According to the present invention, the recess 36 is provided at the case 10, so that locking of the two lock members 2, which are arranged at the side near to the side walls 34 and 44, and the lock portion 8 can be unlocked without touching the two lock members 2 even if a wide working space cannot be given.

In case that the recess portion 36 is not provided at the case 10, for moving off the lock end 23 of the two lock members 2, which is arranged at the side near to the side walls 34 and 44, from the lock portion 8 by moving up the end of the cover 4 to be separated from the case main body 3, the end of the cover 4 near to the side wall 43 must be moved up higher than the case 10 according to the present invention. Therefore, larger space is required above the cover 4. In other words, according to the present invention, the recess 36 and the corner 37 are formed by cutting a part from the flat surface portion 35 for reducing a height of moving up the cover 4 by shifting a fulcrum, around which the end of the cover 4 at the side near to the side wall 43 is moved up to be separated from the case main body 3, inwardly (toward the side wall 33) from the end of the side wall 34 of the case main body 3. Therefore, even if the case 10, that is the electric connection box 1, is arranged in a narrow working space, in which the other components near around the case, the operation for unlocking the lock member 2 can be easily acted by one hand.

In the above embodiment, the electric connection box 1 having the case 10 is explained as the example. The case according to the present invention can be applied to a product other than the electric connection box.

According to the above embodiment, the example in which the support portion 7 is arranged at the cover 4, and the lock portion 8 is arranged at the case main body 3, is explained. According to the present invention, the support portion 7 can be arranged at the case main body 3, and the lock portion 8 can be arranged at the cover 4.

The present inventions are described based in the embodiments as mentioned above, but the present invention is not limited in above embodiments. Various change and modifications can be made with the scope of the present invention.

The invention claimed is:

1. A case, comprising:
a case main body;
a cover mounted at the case main body;
a lock portion arranged at one of the case main body and the cover; and
a plurality of lock members, wherein one end of the lock member is supported rotatably at the other one of the case main body and the cover, and the other end of the lock member is hooked to the lock portion so as to fix the case main body and the cover together,
wherein the plurality of lock members is arranged at one ends of the case main body and the cover and arranged at the other ends of the case main body and the cover,
wherein the case main body is provided with a flat surface portion, on which an edge of the cover at a side near to the case main body is placed, and a recess portion, which is formed by cutting off a part of the flat surface portion at the other end of the case main body so as to make a space between the edge of the cover and itself when the case main body and the cover are fixed by the plurality of lock members.

2. A method for unlocking a case, which comprises,
a case main body;
a cover mounted at the case main body;
a lock portion arranged at one of the case main body and the cover; and a plurality of lock members, wherein one end of the lock member is supported rotatably at the other one of the case main body and the cover, and the other end of the lock member is hooked to the lock portion so as to fix the case main body and the cover together, wherein the plurality of lock members is arranged at one ends of the case main body and the cover and arranged at the other ends of the case main body and the cover, wherein the case main body is provided with a flat surface portion, on which an edge of the cover at a side near to the case main body is placed, and a recess portion, which is formed by cutting off a part of the flat surface portion at the other end of the case main body so as to make a space between the edge of the cover and itself when the case main body and the cover are fixed by the plurality of lock members, the method comprising steps of:

unlocking the lock members, which are arranged at the one ends of the case main body and the cover, locked with the lock portions in condition that the case main body and the cover are locked by the plurality of lock members;

moving the one end of the cover to be separated from the case main body, and the other end of the cover to be close toward the recess portion so as to rotate the cover around a corner formed between the flat surface portion and the recess portion as a fulcrum; and unlocking the lock members and the lock portions provided between the other ends of the case main body and the cover.

* * * * *